United States Patent [19]
Papazian et al.

[11] 4,319,627
[45] * Mar. 16, 1982

[54] CHEMICAL STORAGE OF ENERGY

[75] Inventors: Harold A. Papazian, Yuma, Ariz.; Murlin T. Howerton, Denver, Colo.

[73] Assignee: Martin Marietta Corp., Bethesda, Md.

[*] Notice: The portion of the term of this patent subsequent to Mar. 16, 1999, has been disclaimed.

[21] Appl. No.: 895,606

[22] Filed: Apr. 12, 1978

Related U.S. Application Data

[63] Continuation of Ser. No. 702,838, Jul. 6, 1976, abandoned.

[51] Int. Cl.³ .............................................. F28D 21/00
[52] U.S. Cl. .................................. 165/1; 165/104.12; 122/21
[58] Field of Search ........... 60/644, 649, 613, DIG. 4; 165/1, 2, DIG. 17, 104.12; 62/112; 122/21

[56] References Cited

U.S. PATENT DOCUMENTS 3,183,680  5/1965  Billi ........................................ 62/112

OTHER PUBLICATIONS

Althouse et al, Modern Refrigeration and Air Conditioning, The Goodheart Willcox Co., Inc., South Holland, Ill., 1975, pp. 603 to 608.
Hanneman, 9th Intersociety Energy Conversion Engineering Conference, 1974, pub. by Amer. Soc. of Chemical Engineers, N.Y., N.Y., pp. 435 to 441.

Primary Examiner—Edward A. Miller
Attorney, Agent, or Firm—Gay Chin; Herbert W. Mylius

[57] ABSTRACT

A method of storing energy at ambient temperature and recovering same at an elevated temperature which comprises decomposition of a chemical compound at high temperature with a decomposition product being used to form another compound at low temperature. Upon regeneration of the decomposition product from the other compound there is a release of the originally absorbed high temperature thermal energy.

1 Claim, 4 Drawing Figures

BASIS: SOURCE TEMPERATURE = 344°K (160°F)
STORAGE (SINK) TEMPERATURE = 294°K (70°F)

$Q_2/Q_1 = T_2/T_1 = 294/344 = 0.855$

BASIS: SOURCE TEMPERATURE = 344°K (160°F)
STORAGE (SINK) TEMPERATURE = 294°K (70°F)
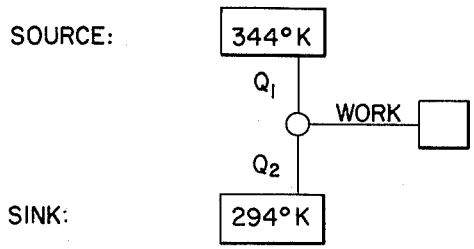
$Q_2/Q_1 = T_2/T_1 = 294/344 = 0.855$
Fig_1
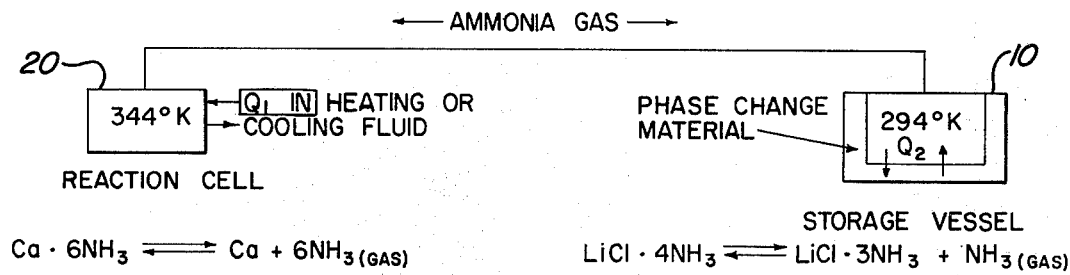
Fig_2
COLLECTION AND STORAGE MODE
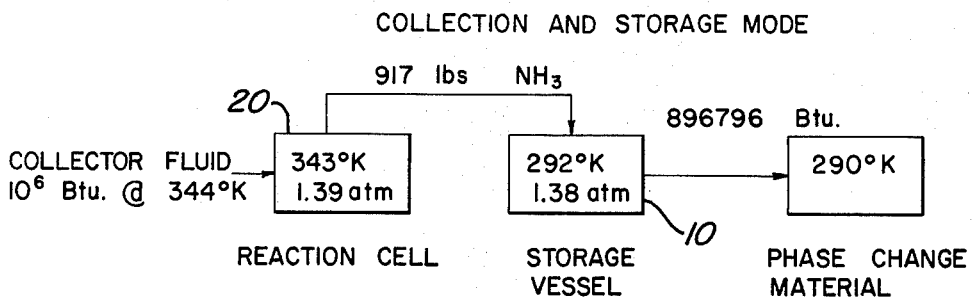
Fig_3
REGENERATION MODE
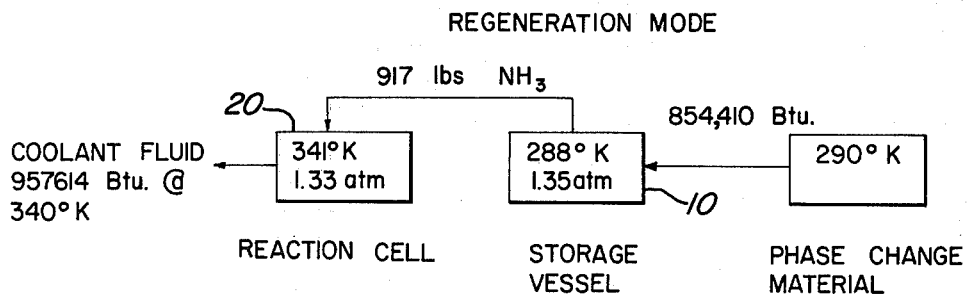
Fig_4

CHEMICAL STORAGE OF ENERGY

This is a continuation of application Ser. No. 702,838 filed July 6, 1976, now abandoned.

Energy systems used heretofore usually store the energy at elevated temperatures. These methods suffer from thermal losses so that only a partial recovery of the stored energy can be made. This situation is aggravated when the energy source is intermittent, since auxiliary heating must be supplied almost immediately. If the energy can be stored at ambient temperatures then normal losses are minimized and storage can be maintained indefinitely. By recovering the energy stored at elevated temperatures a high degree of efficiency can be accomplished.

The prior art U.S. Pat. No. 3,075,361 discloses a heat transfer system wherein solar heat is employed to endothermically dissociate a liquid hydride into a liquid metal and gaseous hydrogen wherein the dissociated hydride products are transferred to a storage vessel (heat sink) to recombine exothermically. The hydride to metal-gas and return is repeated over and over in the heat cycle.

IN THE DRAWINGS

FIG. 1 is a block diagram that illustrates the operation of the present invention relative to the theoretical Carnot cycle performance;

FIG. 2 is a diagrammatic representation of the chemical cycle in the Carnot cycle format;

FIG. 3 is a representation of the collection and storage mode of the present invention using an ammoniated salt system; and, FIG. 4 is a representation of the regeneration mode.

The present invention is directed to any cyclic energy system which receives energy at a high temperature, stores it at a low temperature, and recovers the energy on demand near the temperature at which the energy was received. This may be a solar energy system, nuclear power plant or the like. The energy storage and recovery systems of the present invention are passive and have no moving parts in the usual sense. The only electrical energy required is for the pump which circulates an exchange fluid through the energy collector and through the space to be heat conditioned.

A solar heating system according to the present invention comprises the storage and abstraction of heat of reaction of chemical systems near equilibrium. The preferred chemical systems are ammoniated salts but the invention is not to be construed as being limited thereto. Alcoholates and hydrates, as well as salts of ethers and ketones, may be used.

For most efficient operation it is preferred to select two salt systems that have essentially the same equilibrium vapor pressures at two different temperatures. Then by a slight change in temperature the equilibrium can be shifted to either recombine or dissociate a reaction product from the salt, as desired, and thereby utilize the heat of reaction in a storage or release mode.

The method of the present invention provides the chemical equivalent of a Carnot heat-pump cycle in that high temperature thermal energy is reversibly stored partially in the form of chemical energy and partially in the form of thermal energy at a lower temperature. Then, on demand, the stored energy, both chemical and thermal, is recovered as thermal energy at the original elevated temperature. The method of the present invention has the advantage of passively operating a reversible thermal cycle without the attendant irreversibilities associated with rotating machinery. The net changes in stored chemical energy during the cycle are equivalent to the work interchanged in a mechanical heat engine-pump cycle. By storing the thermal energy at or near ambient temperature, thermal storage losses can be reduced to negligible values.

The novel method of this invention is based on the following key features:

(1) High temperature thermal energy is used to decompose a solid compound such as an ammoniated salt at an elevated temperature in a reaction cell 20.

(2) The gas evolved, for example ammonia, is reacted with another solid at a lower temperature in a separate storage vessel 10 to form a solid compound, for example, an ammoniated salt. The heat generated by this second reaction may be stored, as in a phase change material, such as lithium nitrate trihydrate or other suitable thermal storage means such as a large body of water and the like, near ambient temperature. The high temperature reaction and the low temperature reaction must be paired so that the vapor pressure of the fluid reactant, i.e., ammonia, at the lower temperature is essentially equal to the vapor pressure of the fluid reactant, i.e., ammonia, in the reaction cell 20 at the elevated temperature. The selection of the particular reaction pair is dependent upon the source and sink temperatures desired.

(3) Upon demand, the process can be reversed by lowering the reaction cell 20 temperature with a coolant fluid to a value slightly below the original decomposition temperature. When the reaction-cell pressure drops below the storage vessel pressure, the gaseous reactant can be transferred back to the reaction-cell. During the process, the stored salt in the storage vessel 10 decomposes and recovers the stored, low temperature thermal energy. The vapor reacts in the reaction cell 20 and generates heat at an elevated temperature. This heat of reaction is transferred to the coolant fluid at a temperature only slightly less than the original temperature at which the thermal energy was added to the system.

The only inherent irreversibility peculiar to this cycle is, in effect, a net irreversible transfer of thermal energy from the source to the sink temperatures. This sensible heat degradation is a small fraction of the total heat absorbed. In addition, this cycle also shares the usual heat transfer irreversibilities in common with all real thermal cycles.

The example set forth in FIG. 1 illustrates the operation of the cycle relative to the theoretical Carnot cycle performance.

| Basis: | Source temperature = 344° K. (160° F.) |
|---|---|
| | Storage (Sink) temperature = 294° K. (70° F.) |
| Equation (1) | $Q_2/Q_1 \geq T_2/T_1 = 294/344 = 0.855$ |

The temperature ratio of Equation (1) represents the minimum fraction of thermal energy available at 344° K. which must be stored at 294° K.

Equations (2) and (3) depict the reactions for one system as set forth in FIG. 2 of the drawing.

| REACTION CELL | |
|---|---|
| Equation (2) | $Ca \cdot 6NH_3 \rightleftharpoons Ca + 6NH_3 \uparrow$ |

-continued

| STORAGE VESSEL | |
|---|---|
| Equation (3) | $LiCl \cdot 4NH_3 \rightleftharpoons LiCl \cdot 3NH_3 + NH_3$ |

The following data is from International Critical Tables, McGraw-Hill, New York, Vol. 7, page 224, 1930.

TABLE I

| Reaction Cell | | | Storage Vessel | | |
|---|---|---|---|---|---|
| T° K. | P, atm | ΔH, kcal/gmole $NH_3$ | T° K. | P, atm | ΔH, kcal/gmole of $NH_3$ |
| 344 | 1.4 | 10.3 | 294 | 1.4 | 8.8 |

It is essential that the heats of reaction be referred to the same vapor pressure. Equation (4) verifies that a reversible chemical cycle is equivalent to a mechanical Carnot cycle operating between the same temperature limits—see Equation (1)

Equation (4)   $Q_2/Q_1 = \Delta H_2/\Delta H_1 = 8.8/10.3 = 0.855$

This cycle can be applied to the storage of thermal energy obtained from a solar collector. For the purposes of illustration, reference is made to FIG. 3 which sets forth the collection and storage mode of a system according to the invention on the basis of a $10^6$ Btu of thermal energy leaving the collector in a fluid at 344° K.

Table II is illustrative of the calculations required for the quantities of materials used for Equations (2) and (3).

TABLE II

Reactant requirements to absorb $10^6$ Btu:
Equation (5)

$$\frac{10^6 \text{ Btu.}}{\left(10.3 \times 10^3 \frac{\text{cal}}{\text{gm mole}}\right)\left(1.8 \frac{\text{Btu gm}}{\text{cal lb}}\right)} = 53.94 \text{ lb moles } NH_3 \text{ generated}$$

Equation (6)
$$\left(53.94 \text{ lb} \frac{\text{moles}}{\text{gm}}\right)\left(17 \frac{\text{gm}}{\text{mole}}\right) = 917 \text{ lbs } NH_3 \text{ generated}$$

Equation (7)
$$\left(53.94 \text{ lb} \frac{\text{moles}}{\text{gm}}\right)\left(\frac{1 \text{ mole Ca}}{6 \text{ mole } NH_3}\right)\left(40 \frac{\text{gm}}{\text{mole}} \text{ Ca}\right) =$$

Total weight in reaction cell = $\frac{360 \text{ lbs of Ca.}}{1277 \text{ lbs Ca} \cdot 6NH_3}$ Storage Requirements:
Equation (8)
$$\left(53.94 \text{ lb} \frac{\text{moles}}{\text{gm}}\right)\left(110.4 \frac{\text{gm}}{\text{moles}}\right) = 5955 \text{ lbs of } LiCl \cdot 4NH_3$$

Equation (9)
$\frac{855,000 \text{ Btu.}}{80 \text{ Btu/lb}}$ = 10688 lbs of phase change material with latent heat of fusion = 80 Btu/lb at 290° K.

| Total weight in storage vessel | | = 16,643 lbs |
|---|---|---|
| Sensible heat in $NH_3$ dissipated in storage | = (53.94) (8.56) (1.8) (343-292) = | 42,386 Btu |
| reaction heat released | = (53.94) (8.8 × $10^3$) (1.8) = | 854,410 Btu |
| Total energy transferred to phase change | | = 896,796 Btu |

Because the storage temperature of the example of Table II is selected near ambient, thermal losses are negligible.

Referring now to FIG. 4, there is illustrated the regeneration mode according to the present invention. This illustration indicates that out of the original $10^6$ Btu of energy available at 344° K., 95.8% can be recovered at 340° K. and 4.2% is dissipated at 290° K. This cycle requires no external source of mechanical energy for its operation.

The materials chosen above are for illustration only. Other pairs may also be used with equal success. Choice of particular materials should be dependent on cost if all other factors are equal. The following should be considered in selecting a system.

1. The kinetics of the forward and reverse reactions of the salts;
2. Heat transfer rates; and,
3. Aging cycles of materials.

Space cooling may be carried out by a pair of systems according to the invention in which the reactions are alternatively run in the forward and reverse directions.

For power applications, the following pair of reactions, where equilibrium vapor pressures can be matched over a selected temperature range, are illustrative:

Source: Temperature range 775° K. to 845° K. (935° F. to 1060° F.)
Equation (10)  $2 CuCl_2 \rightleftharpoons Cu_2Cl_2 + Cl_2$   $\Delta H = 42.5$ kcal/mole $Cl_2$ Sink: Temperature range 277° K. to 300° K. (40° F. to 80° F.)
Equation (11)  $Cl_2 \cdot 8H_2O \rightleftharpoons 8H_2O + Cl_2$   $\Delta H = 17.96$ kcal/mole $Cl_2$ In this application only 36% of the collected energy is stored as thermal energy at ambient temperature.

Table III cites two representative experimental points on the vapor pressure curve of the reaction.

Equation (12)   $CaCl_2 \cdot 8NH_3 \rightleftharpoons CaCl_2 \cdot 4NH_3 + 4NH_3$ The pressures listed are slightly higher than current values cited in the literature.

Table IV cites two representative experimental points on the vapor pressure curve of the reaction.

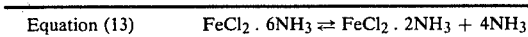

Equation (13)    $FeCl_2 \cdot 6NH_3 \rightleftharpoons FeCl_2 \cdot 2NH_3 + 4NH_3$ The pressures listed are somewhat higher than current values cited in the literature.

Table V lists the ammonia evolution rate (mass of ammonia per hour per mass of available ammonia) as a function of temperature at a constant pressure of 760 torr for the reaction.

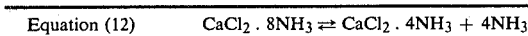

Equation (12)    $CaCl_2 \cdot 8NH_3 \rightleftharpoons CaCl_2 \cdot 4NH_3 + 4NH_3$ The equilibrium temperature at this pressure is 29° C. The data indicates that the ammonia evolution rate is a function of temperature deviation from equilibrium. Additional data indicates that the process is reversible, i.e., $CaCl_2 \cdot 4NH_3$ absorbs $NH_3$ at a rate that is a function of the temperature (29° C.) in the temperature range below the equilibrium temperature.

TABLE III

Equilibrium vapor pressure data obtained for reaction
$CaCl_2 \cdot 8NH_3 \rightleftharpoons CaCl_2 \cdot 4NH_3 + 4NH_3$

| Temperature, °C. | Pressure, Torr |
|---|---|
| 29 | 760 |
| 19 | 450 |

TABLE IV

Equilibrium vapor pressure data obtained for reaction
$FeCl_2 \cdot 6NH_3 \rightleftharpoons FeCl_2 \cdot 2NH_3 + 4NH_3$

| Temperature, °C. | Pressure, Torr |
|---|---|
| 245 | 750 |
| 231 | 450 |

TABLE V

Ammonia evolution rates for the reaction
$CaCl_2 \cdot 8NH_3 \rightleftharpoons CaCl_2 \cdot 4NH_3 + 4NH_3$
vs. temperature (P = 760 Torr)

| Temperature, °C. | Rate of $NH_3$ Evolution, lbs/hr - lb available $NH_3$ |
|---|---|
| 29.0 | 0 |
| 32.2 | .05 |
| 33.8 | .34 |
| 36.0 | .84 |
| 38.5 | 1.45 |

The following reactions were carried out under laboratory conditions to substantiate the operation of the reaction mechanism.

Equation (14)

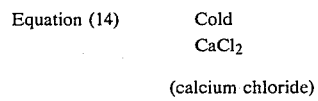

(calcium chloride)

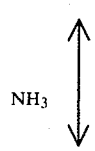

$NH_3$

Hot
$FeCl_2$ (ferrous chloride)

The cold reaction is:

Equation (12)    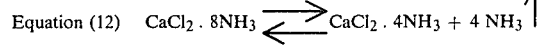

The hot reaction is:

Equation (13)    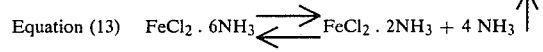

Heat was first applied to the "hot" side and ammonia gas was transferred to the cold side, then to reverse the process, the temperature of the "hot" side was lowered and the calcium chloride ammoniate decomposed endothermally, evolving ammonia which was transferred to the hot side and reacted exothermally with the ferrous chloride ammoniate. The weight change in the reaction vessels was used as a measure of ammonia transfer.

Temperature and weight measurements made during ammonia transfer reactions confirmed the process.

While there have been described what at present are considered to be the preferred embodiments of this invention, it will be obvious to those skilled in the art that various changes and modifications may be made therein without departing from the invention. It is aimed, therefore, in the appended claims to cover all such changes and modifications which fall within the true spirit and scope of the invention.

We claim:

1. A method of storing energy and recovering the same on demand which energy storage steps comprise providing a first chemical compound, which is an ammoniate of ferrous chloride, in a closed reaction zone which compound upon application of thermal energy thereto solely endothermically decomposes into an ammonia gas and a second chemical compound, which is an ammoniate of ferrous chloride, supplying thermal energy to said reaction zone containing said first chemical compound to raise the temperature of the reaction zone and to evolve ammonia gas from the first chemical compound under positive pressure, providing a third chemical compound, which is an ammoniate of calcium chloride, in a separate closed storage zone freely communicating said reaction zone, which third compound is adapted to solely exothermally combine with the ammonia gas evolved by said first compound at substantially ambient temperature, transferring the evolved gas to the storage zone under slight positive pressure reacting the evolved gas with the third compound to evolve thermal energy and to form a fourth chemical compound, which is an ammoniate of calcium chloride, providing a thermal energy storage means, absorbing the thermal energy evolved by said third compound in the thermal storage means and the energy recovery steps comprise absorbing thermal energy from the reaction zone lowering the pressure therein and in the storage zone communicating therewith, causing the fourth compound to solely endothermically decompose at substantially ambient temperature and absorb thermal energy from the thermal storage means as the ammonia gas evolved from the fourth compound is transferred under slight positive pressure to the reaction zone and reacts solely exothermally with the second compound in the reaction zone to evolve thermal energy at a high temperature and wherein the gas pressure in the reaction zone is equal to the gas pressure in the storage zone under static conditions of no energy transfer.

* * * * *